United States Patent
Ishii

(10) Patent No.: US 12,519,117 B2
(45) Date of Patent: Jan. 6, 2026

(54) FUEL CELL SYSTEM

(71) Applicant: SUBARU CORPORATION, Tokyo (JP)

(72) Inventor: Mitsunori Ishii, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 532 days.

(21) Appl. No.: 17/927,104

(22) PCT Filed: Jul. 5, 2021

(86) PCT No.: PCT/JP2021/025357
§ 371 (c)(1),
(2) Date: Nov. 22, 2022

(87) PCT Pub. No.: WO2023/281604
PCT Pub. Date: Jan. 12, 2023

(65) Prior Publication Data
US 2025/0079484 A1  Mar. 6, 2025

(51) Int. Cl.
*H01M 8/04082* (2016.01)
*H01M 8/04* (2016.01)
*H01M 8/04537* (2016.01)
*H01M 8/0662* (2016.01)

(52) U.S. Cl.
CPC ... *H01M 8/04201* (2013.01); *H01M 8/04544* (2013.01); *H01M 8/04574* (2013.01); *H01M 8/04* (2013.01); *H01M 8/0662* (2013.01); *H01M 8/0687* (2013.01); *H01M 2250/20* (2013.01)

(58) Field of Classification Search
CPC ......... H01M 8/04201; H01M 8/04544; H01M 8/04574; H01M 8/04044; H01M 8/0662; H01M 8/04; H01M 8/0687; H01M 2250/20
See application file for complete search history.

(56) References Cited

U.S. PATENT DOCUMENTS

| | | | |
|---|---|---|---|
| 2006/0166045 A1* | 7/2006 | Ryoichi | H01M 8/2457 429/61 |
| 2021/0058084 A1* | 2/2021 | Tanaka | H03K 19/017536 |
| 2021/0277955 A1 | 9/2021 | Ito | |

FOREIGN PATENT DOCUMENTS

| | | |
|---|---|---|
| JP | S60-168555 A | 11/1985 |
| JP | H07-280180 A | 10/1995 |
| JP | 2004-152669 A | 5/2004 |
| JP | 2005-268003 A | 9/2005 |
| JP | 2006-261000 A | 9/2006 |
| JP | 2007-005024 A | 1/2007 |
| JP | 2007-324006 A | 12/2007 |
| JP | 2018-096451 A | 6/2018 |

OTHER PUBLICATIONS

Office Action issued in the corresponding Japanese patent Application No. 2023-532902 dated Jun. 4, 2024, w/ English Translation.

* cited by examiner

*Primary Examiner* — Matthew W Van Oudenaren
(74) *Attorney, Agent, or Firm* — Rimon P.C.

(57) ABSTRACT

A fuel cell system includes a filter disposed in a ventilation passage of an air electrode and including at least a magnet capable of attracting iron particles floating in the ventilation passage, and a notification device configured to notify an accumulation state of the iron particles on the filter.

12 Claims, 4 Drawing Sheets

FUEL CELL SYSTEM

CROSS REFERENCE TO RELATED APPLICATIONS

This application is the U.S. National Phase under 35 US.C. § 371 of International Application No. PCT/JP2021/025357, filed on Jul. 5, 2021, the entire contents of each are hereby incorporated by reference.

TECHNICAL FIELD

The disclosure relates to a fuel cell system.

BACKGROUND ART

As a configuration related to a filter provided in a fuel cell apparatus and used for removing foreign matter, for example, configurations described in the following literatures are known. The fuel cell power generation device described in PTL 1 includes a magnetic field generator formed by arranging permanent magnet members in a lattice shape, and removes iron contained in air flowing through an air supply device with the magnetic field generator. The fuel cell system described in PTL 2 removes abrasion powder of a coating material of a rotor in a compressor that supplies an oxidizing gas to a fuel cell apparatus with a filter provided in an oxidizing gas supply flow path and magnetized by a current flowing through a coil. The fuel cell filter life determination system described in PTL 3 determines, based on a traveling environment of a fuel cell vehicle, the life of a filter that is provided in an air system of a fuel cell apparatus in the fuel cell vehicle and that adsorbs impurities in air.

CITATION LIST

Patent Literature

PTL 1: Japanese Unexamined Patent Application Publication No. 2006-261000
PTL 2: Japanese Unexamined Patent Application Publication No. 2007-324006
PTL 3: Japanese Unexamined Patent Application Publication No. 2004-152669

SUMMARY OF INVENTION

Technical Problem

In the fuel cell power generation device disclosed in PTL 1, there is a problem that clogging occurs as iron is accumulated on the lattice of the permanent magnet, pressure loss increases in a path for supplying the taken-in air to the cathode electrode, and as a result, the power generation capacity of the fuel cell apparatus may be affected. In the fuel cell system disclosed in PTL 2, a filter composed of an electromagnet is used. Therefore, a vehicle power supply is turned off in a fuel cell vehicle to which the fuel cell system is applied, the electromagnetic force is lost, so that the foreign matter that has been attracted is instantaneously released. Further, in the fuel cell system disclosed in PTL 2, there is a problem that when the vehicle power supply is turned on next time, foreign matter that cannot be attracted again by the electromagnet is sucked into the fuel cell apparatus. In the fuel cell filter life determination system described in PTL 3, there is a problem that data of a standard impurity concentration at a position where a vehicle travels or the like is necessary, and the system does not meet a demand for a simple system configuration.

The disclosure has been made in consideration of the above-described problems as an example, and an object thereof is to provide a fuel cell system capable of maintaining the performance of removing foreign matter.

Solution to Problem

A fuel cell system according to the disclosure includes a filter disposed in a ventilation passage of an air electrode and including at least a magnet capable of attracting iron particles floating in the ventilation passage, and a notification device configured to notify an accumulation state of the iron particles on the filter.

Advantageous Effects of Invention

According to the disclosure, it is possible to provide a fuel cell system capable of maintaining the performance of removing foreign matter.

DESCRIPTION OF EMBODIMENTS

Next, preferred embodiments for carrying out the disclosure will be described using a fuel cell vehicle (FCV). Note that the structures and various equipment in the fuel cell vehicle other than those described in detail below may be appropriately supplemented with known equipment, drive mechanisms, and control systems including those described in the above-mentioned patent literatures. Although a fuel cell vehicle is described below as an example of application of the fuel cell system, the application of the fuel cell system to which the disclosure is applicable is not limited to a fuel cell vehicle. For example, the fuel cell system to which the disclosure is applicable may be mounted on a moving object other than a vehicle, such as a ship or a train. Further, the fuel cell system to which the disclosure is applicable may be a stationary system such as a home fuel cell system.

First Embodiment

Fuel Cell System 100 of Fuel Cell Vehicle

First, a configuration of a fuel cell system 100 mounted on a fuel cell vehicle FCV according to an embodiment will be described with reference to FIG. 1.

Figure 1:
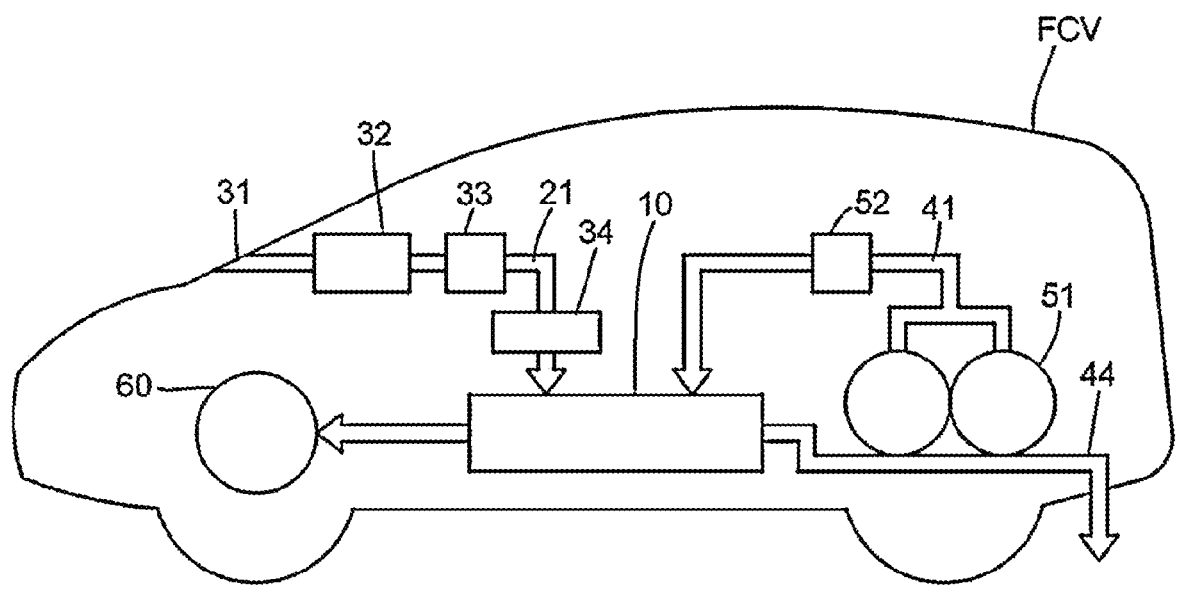
FIG. 1 is a schematic diagram illustrating a configuration of a fuel cell system according to an embodiment of the disclosure.

As is understood from FIG. 1, the fuel cell vehicle FCV on which the fuel cell system 100 according to the present embodiment is mounted includes a fuel cell apparatus 10, an air supply passage 21, an air intake port 31, a chemical filter 32, a compressor 33, a magnet filter 34, a hydrogen gas supply passage 41, a water discharge passage 44, a hydrogen tank 51, an on-off valve 52, and a drive motor 60.

As the fuel cell apparatus 10, a known fuel cell apparatus that can be mounted on the fuel cell vehicle FCV can be used. The fuel cell apparatus 10 generates electric power by reacting a fuel gas (for example, hydrogen gas) with an oxidizing gas (for example, air). The fuel cell apparatus 10 has a fuel cell stack in which multiple fuel cells are stacked, and each of the fuel cells is provided with a known membrane electrode assembly (MEA) including an electrolyte membrane, an anode electrode, and a cathode electrode. As an example, the fuel cell apparatus 10 is used as an electric power source of the drive motor 60 of the fuel cell vehicle FCV.

A known air flow path through which air flows is formed in the fuel cell apparatus 10. The air supply passage 21 is coupled to one end of the air flow path. In the fuel cell apparatus 10, the air flow path is disposed so as to pass through the respective fuel cells. A known hydrogen gas flow path through which hydrogen gas flows is formed in the fuel cell apparatus 10. The hydrogen gas supply passage 41 is coupled to one end of the hydrogen gas flow path. In the fuel cell apparatus 10, the hydrogen gas flow path is disposed so as to pass through the respective fuel cells.

The air supply passage 21 is a flow path through which air to be supplied to the fuel cell apparatus 10 flows (a ventilation passage of an air electrode). The air supply passage 21 is provided with the air intake port 31, the chemical filter 32, the compressor 33, and the magnet filter 34 in this order from the upstream side. The magnet filter 34 is electrically coupled to a notification device 36 described below.

The air intake port 31 is an intake port through which air (for example, outside air that is air outside the vehicle) is taken in. The chemical filter 32 may be, for example, a known chemical filter and has a function of removing foreign matter (sand, fine dust, chemical substances, and the like) contained in the air flowing through the air supply passage 21. The compressor 33 may be, for example, a known compressor and has a function of compressing the air on the upstream side of the compressor 33 and sending the compressed air to the downstream side (that is, the fuel cell apparatus 10 side). The magnet filter 34 captures iron particles contained in the air flowing through the air supply passage 21. In addition, since the magnet filter 34 is installed on the downstream side in the ventilation direction of the compressor 33, the magnet filter 34 can also capture iron particles contained in abrasion powder of the compressor 33.

When the compressor 33 is driven, air is taken in from the air intake port 31, and the air is supplied to the air flow path in the fuel cell apparatus 10 through the air supply passage 21. In the fuel cell apparatus 10, if iron particles are contained in the supplied air, the iron particles that have passed through the chemical filter 32 and reached the cathode electrode become ions in the electrolyte membrane and accelerate deterioration of the electrolyte membrane. As a result, the life characteristics of the fuel cell apparatus 10 are degraded. Further, if the abrasion powder generated with the rotation of the rotor of the compressor 33 contains iron particles, the iron particles similarly affect life characteristics of the fuel cell apparatus 10. In order to avoid such a situation, the iron particles are captured by the magnet filter 34 disposed in the air supply passage 21.

The notification device 36 (a known speaker, a known onboard monitor, a light emitting diode described later, or the like) for notifying the amount of captured iron particles is electrically coupled to the magnet filter 34. With the magnet filter 34 and the notification device 36 as described above, it is possible to maintain the performance of removing foreign matter in the magnet filter 34. The magnet filter 34 is coupled to a known power supply P. The power supply P supplies electric power to the magnet filter 34. The notification device 36 performs notification to an occupant of the fuel cell vehicle FCV based on capture of iron particles Fe by the magnet filter 34.

Hereinafter, the structure of the magnet filter 34 will be described in detail with reference to FIGS. 2 to 5.

Figure 2:
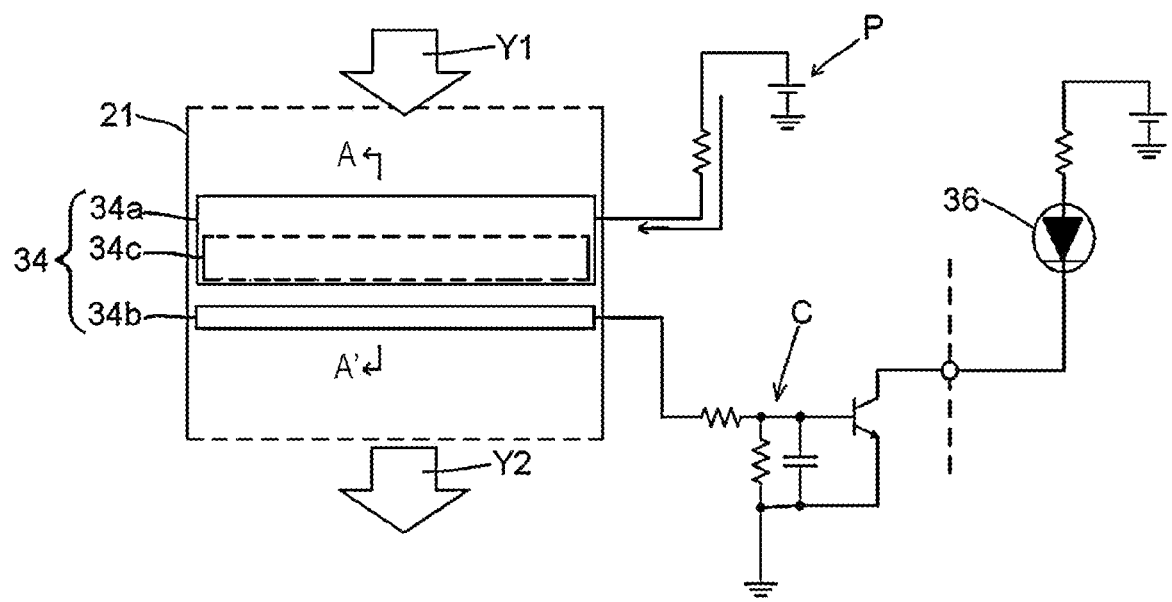
FIG. 2 is a schematic diagram illustrating a part of the fuel cell system according to the embodiment.
Figure 3:
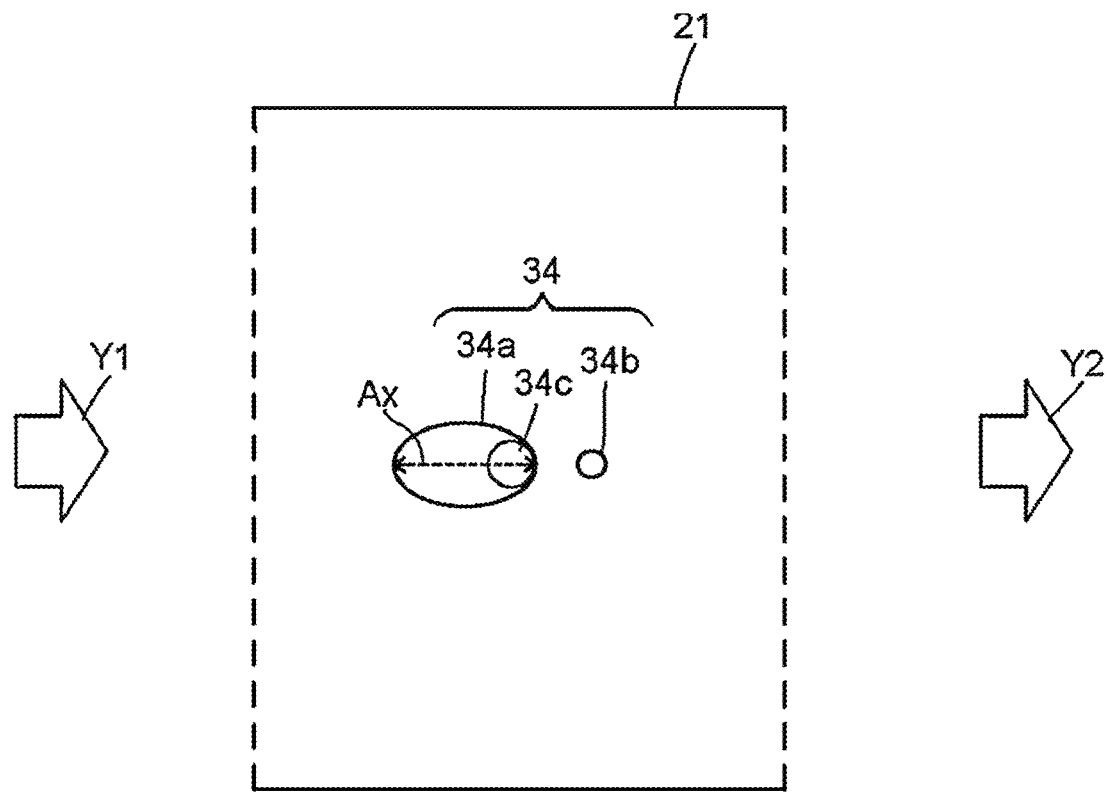
FIG. 3 is a cross-sectional view taken along line A-A' in FIG. 2.
Figure 4:
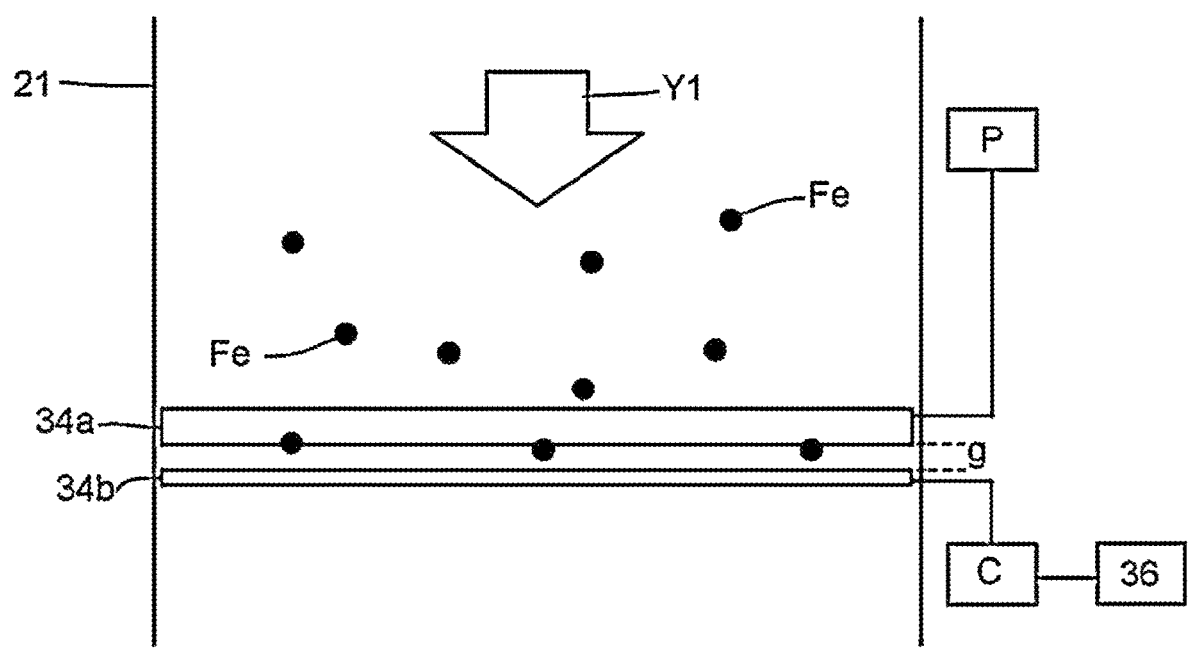
FIG. 4 is a schematic diagram for describing the fuel cell system according to the embodiment.

FIG. 2 is a schematic diagram illustrating a schematic configuration of the magnet filter 34. FIG. 3 is a cross-sectional view taken along line A-A' in FIG. 2.

The magnet filter 34 is disposed inside the air supply passage 21. The magnet filter 34 includes a hollow elliptic cylindrical magnetic material 34a and a columnar magnetic material rod 34b disposed to face the elliptic cylindrical magnetic material 34a with a predetermined gap therebetween. A permanent magnet 34c is disposed inside the elliptic cylindrical magnetic material 34a. The power supply P is coupled to the hollow elliptic cylindrical magnetic material 34a. The notification device 36 is electrically coupled to the columnar magnetic material rod 34b.

As the hollow elliptic cylindrical magnetic material 34a, for example, a known elliptic pipe made of steel can be used. As the columnar magnetic material rod 34b, a metal rod made of iron, nickel, or an alloy thereof can be used. Herein, the magnetic material refers to a substance capable of exhibiting magnetism, and examples thereof include iron oxide, chromium oxide, cobalt, and ferrite.

The hollow elliptic cylindrical magnetic material 34a is disposed on the upstream side (arrow Y1 side) of the air supply passage 21 from the columnar magnetic material rod 34b. The permanent magnet 34c is disposed inside the hollow elliptic cylindrical magnetic material 34a at a position close to the hollow elliptic cylindrical magnetic material 34a. In one example, as illustrated in FIG. 3, the cross section of the hollow elliptic cylindrical magnetic material 34a has a major axis Ax disposed substantially parallel to the flow of air sent into the fuel cell apparatus 10. Further, the permanent magnet 34c and the columnar magnetic material rod 34b are disposed so as to be close to each other. The type of the permanent magnet 34c is not particularly limited, and known ferrite magnets, neodymium magnets, alnico magnets, and the like can be used. The shape of the permanent magnet 34c may be a bar shape (bar magnet) as illustrated in FIGS. 2 and 3, or may be a round shape or the like. By using the permanent magnet as described above, it is possible to avoid loss of the electromagnetic force due to, for example, an unintended stop of electric power supply.

In FIGS. 2 and 3, the magnet filter 34 is installed at one position inside the air supply passage 21, but the disclosure is not limited to this form. That is, a plurality of magnet filters 34 may be installed inside the air supply passage 21 in the ventilation direction. Further, the installation position is also not particularly limited, and the magnet filter 34 can be installed at any position between the air intake port 31 and the fuel cell apparatus 10. Although the magnet filter 34 has a bar shape in FIGS. 2 and 3, the shape of the magnet filter 34 is not limited to this, and the magnet filter 34 may have a known shape such as a lattice shape or a mesh shape. When the magnet filter 34 has a lattice shape or a mesh shape, an improvement in the effect of attracting iron particles Fe can be expected. Herein, the lattice shape refers to a state in which multiple bar magnets are arranged in a horizontal direction or a vertical direction, and the mesh shape is understood as a state in which multiple bar magnets are arranged in directions intersecting each other.

In FIG. 2, arrows Y1 and Y2 indicate the flow of air (for example, air sent from the air intake port 31 into the fuel cell apparatus 10). When the compressor 33 is driven, a gas flows toward the direction indicated by the arrow Y1. When iron particles Fe are contained in the flowing gas, the iron particles Fe are captured or attracted by the magnetic force of the permanent magnet 34c. The captured iron particles Fe stick to the surface of the hollow elliptic cylindrical magnetic material 34a. At this time, since the permanent magnet 34c is disposed on the downstream side in the ventilation direction inside the hollow elliptic cylindrical magnetic material 34a as described above, the iron particles Fe are accumulated toward the downstream side in the ventilation direction as the amount of captured iron particles Fe increases. That is, the iron particles Fe are accumulated between the permanent magnet 34c and the columnar magnetic material rod 34b with the hollow elliptic cylindrical magnetic material 34a therebetween. Even when the accumulation amount or attraction amount of the iron particles Fe increases, the cross-sectional area of the air flow path of the air supply passage 21 does not substantially decrease. Thus, the problem of an increase in pressure loss in the air flow path can be reduced. After the iron particles Fe are captured, the air is sent in the direction of the arrow Y2 toward the fuel cell apparatus 10.

The notification device 36 is electrically coupled to the columnar magnetic material rod 34b of the magnet filter 34 and gives notification of the accumulation state of iron particles Fe on the magnet filter 34. That is, the iron particles Fe sticking to the elliptic cylindrical magnetic material 34a are accumulated toward the direction of the columnar magnetic material rod 34b. Subsequently, when electrical conduction is established between the elliptic cylindrical magnetic material 34a and the columnar magnetic material rod 34b, the notification is performed by the notification device 36 electrically coupled to the columnar magnetic material rod 34b. As illustrated in FIG. 2, a known light emitting diode can be applied to the notification device 36. In this case, when the amount of iron particles Fe accumulated on the magnet filter 34 reaches a predetermined amount or more, the light emitting diode emits light to notify the state of accumulation on the magnet filter 34. In the present embodiment, by applying the light emitting diode to the notification device 36, a visual notification effect can be obtained at low cost.

That is, as described above, as illustrated in FIG. 4, the hollow elliptic cylindrical magnetic material 34a and the columnar magnetic material rod 34b are disposed to face each other with a predetermined gap g therebetween, and the iron particles Fe floating inside the air supply passage 21 are captured by the permanent magnet 34c. The captured iron particles Fe are accumulated in the space (gap g) between the hollow elliptic cylindrical magnetic material 34a and the columnar magnetic material rod 34b. When the iron particles Fe stick to the permanent magnet 34c via the hollow elliptic cylindrical magnetic material 34a but the iron particles Fe have not yet reached the columnar magnetic material rod 34b, electrical conduction is not established between the elliptic cylindrical magnetic material 34a and the columnar magnetic material rod 34b. Therefore, in this state, the notification by the notification device 36 is not performed.

Figure 5:
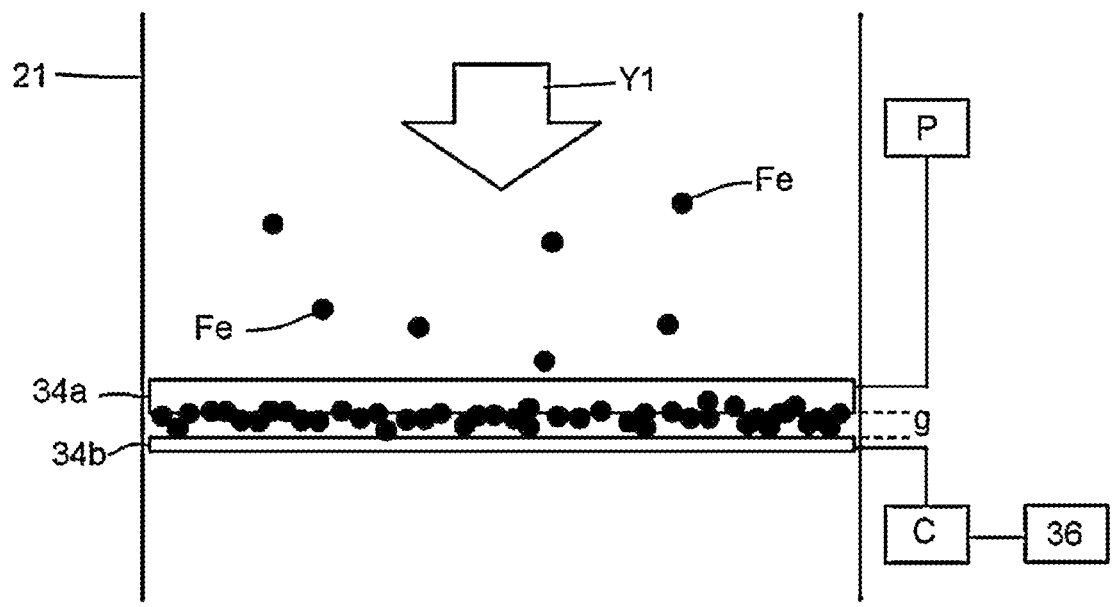
FIG. 5 is another schematic diagram for describing the fuel cell system according to the embodiment.

On the other hand, as illustrated in FIG. 5, when the gap g between the hollow elliptic cylindrical magnetic material 34a and the columnar magnetic material rod 34b is filled with the accumulated iron particles Fe, electrical conduction is established between the elliptic cylindrical magnetic material 34a and the columnar magnetic material rod 34b. The electric power supplied by the power supply P flows to the columnar magnetic material rod 34b through the accumulated iron particles Fe. As described above, in the present embodiment, the accumulation of the predetermined amount or more of iron particles can be detected by adopting the configuration in which electrical conduction is established when the predetermined amount or more of iron particles are accumulated between the magnet and the magnetic material. As illustrated in FIG. 2, the light emitting diode is coupled to the columnar magnetic material rod 34b via a known open collector output circuit, and the accumulation of iron particles Fe on the magnet filter 34 is detected by the light emission of the light emitting diode. By coupling the notification device 36 via the open collector output circuit, it is possible to control notification by the notification device 36 without using a general sensor or control device. Since the permanent magnet 34c is disposed inside the hollow elliptic cylindrical magnetic material 34a, the iron particles Fe sticking to the magnet filter 34 can be easily removed or cleaned by taking out the permanent magnet 34c from the inside of the hollow elliptic cylindrical magnetic material 34a.

In the present embodiment, the magnet filter 34 has a configuration in which the hollow elliptic cylindrical magnetic material 34a and the columnar magnetic material rod 34b are disposed to face each other, and the permanent magnet 34c is disposed inside the hollow elliptic cylindrical magnetic material 34a, but the configuration is not limited thereto. That is, the magnet filter 34 can have any configuration as long as it is possible to avoid a phenomenon in which the cross-sectional area of the air flow path of the air supply passage 21 decreases as the iron particles Fe captured by the magnet filter 34 are accumulated.

Figure 6:
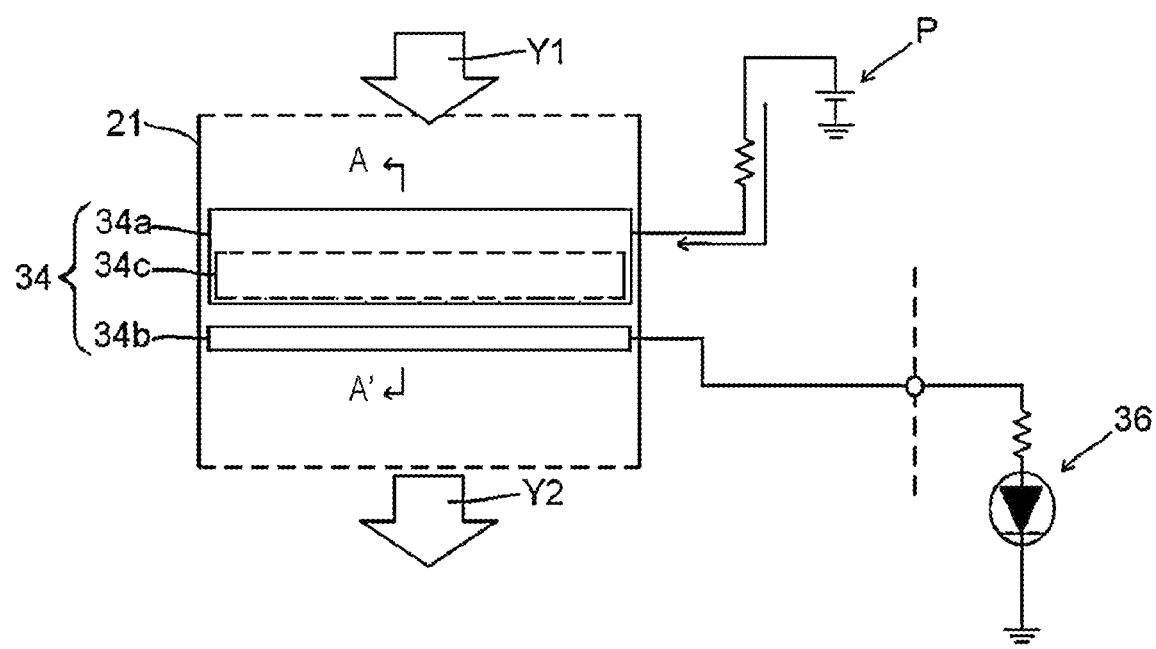
FIG. 6 is a first schematic diagram for describing another example of the fuel cell system according to the embodiment.
Figure 7:
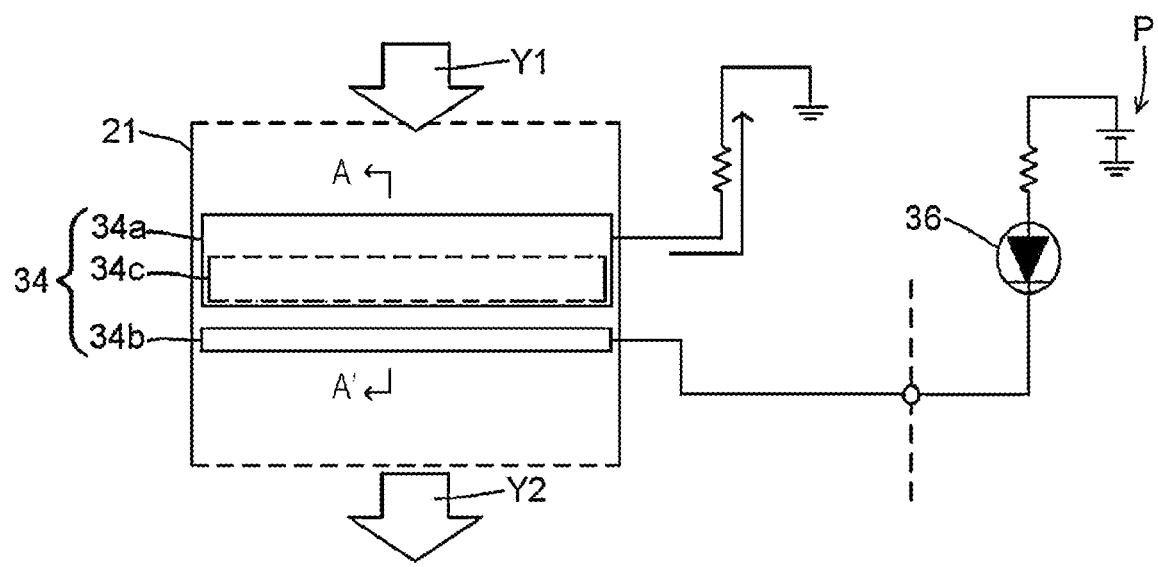
FIG. 7 is a second schematic diagram for describing another example of the fuel cell system according to the embodiment.

Even when electrical conduction is established between the hollow elliptic cylindrical magnetic material 34a and the columnar magnetic material rod 34b, it is also possible not to perform the notification by the notification device 36 in accordance with the resistance value of the resistor in the open collector output circuit described above. That is, the notification by the notification device 36 may be performed on condition that the amount of current or the amount of voltage conducted to the magnet filter 34 due to accumulation of the iron particles Fe reaches a predetermined amount. Further, as illustrated in FIGS. 6 and 7, the light emitting diode may be directly coupled to the columnar magnetic material rod 34b without the open collector output circuit interposed therebetween. Further, an analog circuit other than the circuit illustrated in FIG. 2 may be coupled to the columnar magnetic material rod 34b.

Further, the notification method of the notification device 36 may be changed according to the amount of current or the amount of voltage conducted to the magnet filter 34. For example, when the amount of current conducted to the magnet filter 34 increases in accordance with the accumulation amount or attraction amount of the iron particles Fe, thresholds of the amount of current may be set in stages respectively, and the emission color of the light emitting diode serving as the notification device 36 may be changed in stages based on the increase in the amount of current. It is also possible to gradually increase the volume of the sound output from the speaker serving as the notification device 36 based on the increase in the amount of current.

In the above description, the light emitting diode is used as the notification device 36, but the notification device 36 is not limited thereto. A known device configured to perform notification using light, such as a fluorescent lamp or an incandescent lamp, can be used as appropriate. As a device configured to perform notification by a method other than light, a known sound notification device or image display device can also be used. The sound notification device may be, for example, a device configured to perform notification by a sound, such as a known speaker or buzzer. Further, the image display device may be, for example, a known electric bulletin board or liquid crystal display notifies the accumulation state of iron particles Fe by an image. The notification device 36 may be installed at any position inside or outside the vehicle cabin.

The hydrogen gas supply passage 41 is a flow path through which hydrogen gas to be supplied to the fuel cell apparatus 10 flows. The hydrogen gas supply passage 41 is provided with the hydrogen tank 51 serving as a hydrogen supply source and the on-off valve 52 in this order from the upstream side. The hydrogen tank 51 has a known structure capable of storing hydrogen. When the on-off valve 52 is in an open state, hydrogen gas is supplied from the hydrogen tank 51 through the hydrogen gas supply passage 41 to the hydrogen gas flow path in the fuel cell apparatus 10. The hydrogen gas supply passage 41 may be formed of a single member or a plurality of members. A known electromagnetic valve or the like can be used as the on-off valve 52.

In the present embodiment, the fuel cell system 100 is mounted on a fuel cell vehicle FCV, and the fuel cell apparatus 10 can be used as an electric power source of the drive motor 60 of the fuel cell vehicle FCV. Water generated by power generation of the fuel cell apparatus 10 is discharged through the water discharge passage 44.

According to the fuel cell system 100 in the present embodiment described above, it is possible to maintain the performance of removing foreign matter, which may adversely affect the fuel cell apparatus 10, with a simple configuration using magnetic force.

Second Embodiment

Next, a fuel cell system of a fuel cell vehicle according to a second embodiment will be described with reference to FIG. 8. In the embodiments and modifications described below, components having the same functions as those of the first embodiment described above are denoted by the same reference numerals, and a description thereof will be omitted as appropriate.

In the above-described first embodiment, the accumulation state of the iron particles Fe on the magnet filter 34 is notified by the light emitting diode serving as the notification device 36 via a known open collector output circuit. In contrast, in the present embodiment, the accumulation state of the iron particles Fe on the magnet filter 34 is notified via a control device 70 electrically coupled to the magnet filter 34.

Figure 8:
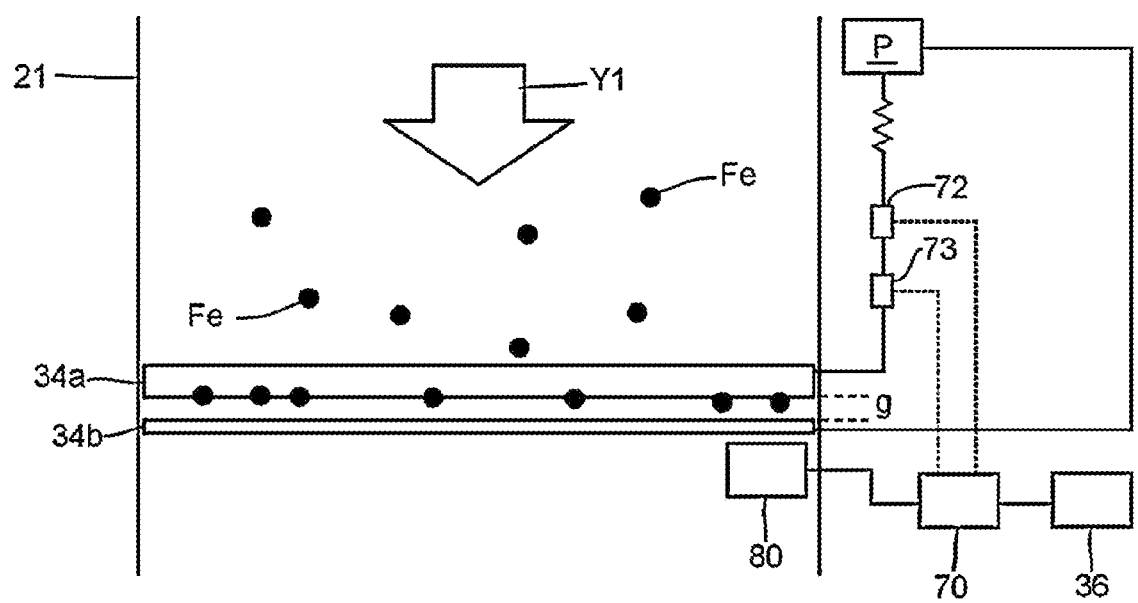
FIG. 8 is a schematic diagram illustrating a part of the fuel cell system according to the embodiment.

As illustrated in FIG. 8, the fuel cell system further includes a current sensor 72, a voltage sensor 73, and a control device 70. The current sensor 72 is a known sensor capable of detecting a current flowing from the power supply P through the magnet filter 34 and outputs a detected current value to the control device 70. The voltage sensor 73 is a known sensor capable of detecting a voltage applied to the magnet filter 34 and outputs a detected voltage value to the control device 70.

The control device 70 controls the notification operation of the notification device 36 based on one or both of the received current value and voltage value. Here, the control device 70 can control the timing of notification of the predicted cleaning time of the magnet filter 34. Details of the processing performed by the control device 70 will be described later.

The control device 70 includes, for example, a CPU (Central Processing Unit) serving as an arithmetic processing device, a ROM (Read Only Memory) serving as a storage element that stores programs, arithmetic parameters, and the like used by the CPU, and a RAM (Random Access Memory) serving as a storage element that temporarily stores parameters and the like that change as appropriate during execution of the CPU. The control device 70 may be a known computer (onboard ECU (Electronic Control Unit)) that electronically controls various onboard electronic devices, such as onboard safety equipment, air conditioning and a fuel cell apparatus. In one example, the control device 70 may be incorporated in a power ECU or the like of the fuel cell vehicle and may control the operation of the notification device 36 by software.

Communication between the control device 70 and each device is realized using, for example, CAN (Controller Area Network) communication.

Next, a description will be made of a method for detecting the accumulation amount or attraction amount of iron particles Fe in the magnet filter 34, using the fuel cell system according to the present embodiment. The detection method described in detail is executed by the control device 70 described above.

The current sensor 72 detects the value of the current flowing through the magnet filter 34 and outputs the detection result to the control device 70. Further, the voltage sensor 73 detects the value of the voltage applied to the magnet filter 34 and outputs the detection result to the control device 70. The control device 70 determines whether one or both of the detection result of the current sensor 72 and the detection result of the voltage sensor 73 satisfy a predetermined condition. When it is determined that the detection result of the current sensor 72 or the voltage sensor 73 satisfies the predetermined condition, the control device 70 outputs, to the notification device 36, a control signal for performing notification. The notification device 36 that has received the control signal executes notification to an occupant of the fuel cell vehicle FCV, thereby giving notification of the accumulation state of the iron particles Fe on the magnet filter 34. In the present embodiment, since the condition for the detection result of the current sensor 72 or the voltage sensor 73 is set by the control device 70 for controlling the notification of the accumulation state of the iron particles Fe as described above, the notification pattern by the notification device 36 can be further divided into details.

Method for Cleaning Magnet Filter

Hereinafter, a method for cleaning iron particles Fe sticking to the magnet filter 34 will be described.

In the fuel cell system 100 of the first embodiment, when iron particles Fe sticking to the magnet filter 34 are cleaned, the sticking iron particles Fe can be easily detached by pulling out the permanent magnet 34c inserted inside the hollow elliptic cylindrical magnetic material 34a. In the present embodiment, since a permanent magnet is used instead of an electromagnet in order to capture the iron particles Fe, the captured iron particles Fe are not detached when the vehicle power supply is turned off. Therefore, it is possible to avoid a decrease in life characteristics of the fuel cell apparatus due to unintentional release of the iron particles Fe.

The fuel cell system of the embodiment may further include a removal device 80 for removing iron particles Fe sticking to the magnet filter 34. In one example, removal of the iron particles Fe sticking to the magnet filter 34 can be executed by the above-described control device 70 as follows.

The current sensor 72 detects the value of the current flowing through the magnet filter 34 and outputs the detection result to the control device 70. Further, the voltage sensor 73 detects the value of the voltage applied to the magnet filter 34 and outputs the detection result to the control device 70. The control device 70 determines whether one or both of the detection result of the current sensor 72 and the detection result of the voltage sensor 73 satisfy a predetermined condition. When it is determined that the detection result of the current sensor 72 or the voltage sensor 73 satisfies the predetermined condition, the control device 70 outputs, to the removal device 80, a control signal for removing the iron particles Fe sticking to the magnet filter 34. The removal device 80 that has received the control signal removes the iron particles Fe sticking to the magnet filter 34, thereby cleaning the magnet filter 34. As described above, since both the removal device 80 for removing the iron particles Fe accumulated on the magnet filter 34 and the control device 70 for controlling the removal device 80 are provided, the performance of the magnet filter 34 can be maintained for a long period of time. Before and/or after the cleaning of the magnet filter 34 is performed by the removal device 80, the above-described notification device 36 may give the notification of the accumulation state of the iron particles Fe on the magnet filter 34.

Examples of the removal device 80 described above include a known suction device configured to remove the sticking iron particles Fe from the magnet filter 34 by suction and a known scraper configured to scrape the sticking iron particles Fe from the surface of the magnet filter 34.

Method for Predicting Magnet Filter Cleaning Time

Hereinafter, a description will be made of a method for predicting the time (cleaning time) at which the iron particles Fe sticking to the magnet filter 34 in the fuel cell system of the present embodiment are to be removed. This prediction method is executed by the above-described control device 70 according to the following procedure after electrical conduction is established between the elliptic cylindrical magnetic material 34a and the columnar magnetic material rod 34b. In the present embodiment, the cleaning time of the magnet filter 34 is predicted by the control device 70 based on the detection result of the current sensor 72 or the voltage sensor 73. For example, after the detection results of the current sensor 72 or the voltage sensor 73 are obtained at different points in time, the cleaning time can be predicted based on the amount of change in the obtained detection results. In one example, the cleaning time may be predicted by the following procedure. That is, in the fuel cell system of the present embodiment, the current sensor 72 detects a current value a of current flowing through the magnet filter 34 at any time point A.

Next, the current sensor 72 detects a current value b of current flowing through the magnet filter 34 at a time point A + B after a lapse of a predetermined time from the time point A. At this time, the obtained current value b reflects the amount of accumulation increase in the iron particles Fe accumulated during the time B. The control device 70 determines the value of "current value b−current value a" to thereby predict a future time point X at which a preset current value x at the time when the magnet filter 34 is to be cleaned can be measured. The notification device 36 may notify an occupant of the fuel cell vehicle FCV of this future time point X. In this manner, the cleaning time of the magnet filter 34 is predicted and notified, so that the cleaning can be performed before the performance of the magnet filter 34 deteriorates. In the above example, the cleaning time of the magnet filter 34 is predicted based on the current value, but the method is not limited thereto. The cleaning time of the magnet filter 34 may be predicted using another detection value such as a voltage value.

In the above embodiments, the fuel cell system is described as being mounted on a fuel cell vehicle, but the fuel cell system is not limited thereto. For example, the fuel cell system according to the disclosure can also be applied to a stationary system such as a home fuel cell system.

It is obvious to those who have ordinary skill in the field of technology to which the disclosure pertains that further modifications to the embodiments and modifications are conceivable within the scope of the technical ideas described in the claims. It is naturally understood that such modifications also belong to the technical scope of the disclosure.

REFERENCE SIGNS LIST

10 fuel cell apparatus
21 air supply passage
31 air intake port
32 chemical filter
33 compressor
34 magnet filter
36 notification device
41 hydrogen gas supply passage
44 water discharge passage
51 hydrogen tank
52 on-off valve
60 drive motor
70 control device
100, 200 fuel cell system
FCV fuel cell vehicle

The invention claimed is:

1. A fuel cell system comprising:
   a filter disposed in a ventilation passage of an air electrode, the filter including at least a magnet configured to attract iron particles floating in the ventilation passage and a magnetic material disposed to face the magnet with a predetermined gap between the magnet and the magnetic material; and
   a notification device configured to notify an accumulation state of the iron particles on the filter when accumulation of a predetermined amount or more of the iron particles in the gap establishes electrical conduction between the magnet and the magnetic material,
   wherein the magnet, the gap, and the magnetic material are arranged along a ventilation direction of the ventilation passage in that order so that the iron particles accumulated extend from the magnet toward the magnetic material along the ventilation direction.

2. The fuel cell system according to claim 1, wherein the magnet is disposed inside a hollow cylinder.

3. The fuel cell system according to claim 1, further comprising a compressor disposed in the ventilation passage of the air electrode and configured to compress air and send the compressed air to a downstream side, wherein the filter is disposed on the downstream side in the ventilation direction of the compressor.

4. The fuel cell system according to claim 1, wherein the notification device is electrically coupled to the magnetic material.

5. The fuel cell system according to claim 1, wherein the notification device and the filter are coupled to each other via an open collector output circuit.

6. The fuel cell system according to claim 1, further comprising a sensor configured to detect one or both of a value of voltage applied to the filter and a value of current flowing through the filter.

7. A fuel cell system comprising:
   a filter disposed in a ventilation passage of an air electrode, the filter including at least a magnet configured to attract iron particles floating in the ventilation passage;
   a notification device configured to notify an accumulation state of the iron particles on the filter;
   a sensor configured to detect one or both of a value of voltage applied to the filter and a value of current flowing through the filter; and
   a control device configured to control, based on a detection result of the sensor, notification of the accumulation state of the iron particles on the filter by the notification device,
   wherein the filter further includes a magnetic material disposed to face the magnet with a predetermined gap between the magnet and the magnetic material with respect to a ventilation direction in the ventilation passage, and
   wherein electrical conduction is established when a predetermined amount or more of the iron particles are accumulated between the magnet and the magnetic material.

8. The fuel cell system according to claim 7, further comprising:
   a removal device configured to remove the iron particles accumulated on the filter; and
   a control device configured to control, based on the detection result of the sensor, removal of the iron particles by the removal device.

9. The fuel cell system according to claim 7,
   wherein a cleaning time of the filter is predicted by the control device based on the detection result of the sensor, and
   the predicted cleaning time is notified by the notification device.

10. The fuel cell system according to claim 1, wherein the notification device is a light emitting diode.

11. The fuel cell system according to claim 1, wherein the filter has a lattice shape or a mesh shape.

12. The fuel cell system according to claim 1, wherein the magnet is a permanent magnet.

\* \* \* \* \*